July 8, 1941.　　　　C. E. HATHORN　　　　2,248,755

RIVET

Filed Nov. 25, 1939

INVENTOR
CHARLES E. HATHORN.
BY
ATTORNEY

Patented July 8, 1941

2,248,755

UNITED STATES PATENT OFFICE 2,248,755

RIVET

Charles E. Hathorn, Kenmore, N. Y., assignor to Curtiss-Wright Corporation, a corporation of Delaware Application November 25, 1939, Serial No. 306,109

4 Claims. (Cl. 85—40)

This invention relates to rivets, being particularly concerned with that type of rivet which is adapted to be applied and driven from one side only of the sheets or plate to be joined.

An object of the invention is to provide a hollow rivet adapted to be inserted through alined holes formed in superposed sheets or plates of metal, the rivet being drivable from the same side of the work from which it is inserted.

A further object of the invention consists in the provision of a rivet having a bulge in its bore which bulge is adapted to be expanded upon the application of a suitable tool to form a head or protuberance on the inaccessible side of the plates.

Still another object is to provide a blind rivet, adapted to be applied and driven from the same side of the work, in which the driving mandrel is adapted to remain, in part, in the rivet, to form a solid core therefor.

A further object of the invention consists in adapting the blind rivet for driving either by punching a mandrel therethrough from the outside of the work, or by drawing a previously inserted mandrel through the rivet to form the headed portion thereof.

Further objects will become apparent in reading the annexed detailed description in connection with the drawing, in which.

Figure 1:
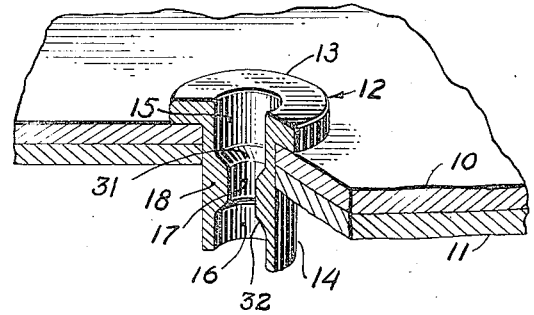
Fig. 1 is a perspective view of the rivet of this invention, before driving, shown partly in section.

In the drawing, superposed plates 10 and 11 are drilled to receive a rivet 12 which comprises a head 13 lying on the outside of the plates, and a cylindrical shank 14 passing through the drilling. The rivet is hollow, as shown, comprising a large counterbore 15 at the head end of the rivet and a similar large counterbore 16 at the shank end of the rivet, the bottoms of these counterbores being separated and joined by a through bore of smaller diameter, shown at 17. The thick wall portion 18 formed by the bore 17 is so located that it overlaps the thickness of the plates 10 and 11 but lies predominantly clear of the plates. Driving of the rivet is accomplished by means of a tool or mandrel 19, comprising a shank 20 of such diameter that it may pass freely through the bore 17, and an enlarged head 21 whose outside diameter is substantially the same as that of the counterbores 15 and 16. The sides of the head 21 are tapered as shown at 30. To drive the rivet, the mandrel 19 is first passed through the rivet from the shank end, and the rivet and the mandrel are inserted together through the plates so that the shank 20 protrudes outside of the rivet head 13. Thereupon, a plier-like tool is utilized, one jaw of the plier grasping the shank 20 and the other jaw bearing upon the head 13. By squeezing the pliers, the mandrel 19 is drawn through the hollow of the rivet, the head 21 engaging the thickened wall 18 and forcing same to expand to the position of Fig. 3 whereupon a bulge is formed exteriorly of the rivet which firmly engages the inside surface of the plate 11 and forms an inner head by which the plates are securely attached to one another.

It is apparent that it would be possible to eliminate the counterbore 16 without interfering with expansion of the thick wall 18, but the rivet extension embodying the counterbore 16 is an important feature of the invention since the thin wall defined by the counterbore 16 serves to prevent cracking of the thick wall 18 as the mandrel is drawn through the rivet. Initial attempts in the design of a bulge rivet were largely unsuccessful since radial cracks developed in the thick wall 18 after same had been expanded to form the bulge, but the addition of the extension formed by the counterbore 16 solved the problem of eliminating the cracks.

It should be further noted that the transition from the small bore 17 to the large counterbores 15 and 16 is accomplished through tapered shoulders 31 and 32 whose taper will be of a suitable angle determinable in accordance with the characteristics of the rivet material and the dimensions of the rivet. These tapered shoulders, in conjunction with the taper 30 of the mandrel head, assure bulging of the rivet, without bending the internal collar formed within the rivet, but rather by smoothly flowing the rivet material from an internal bulge to an external bulge as at 33 with moderate local stresses in the rivet material.

Rivets of the type disclosed may be applied where the metal sheets to be joined are loosely held, since the driving force and reaction are wholly assumed by the driving tool. However, if the plates are sufficiently firmly held, rivets of the type disclosed may be driven by applying the mandrel 19 from the outside of the work and hammering same inwardly, whereby the thickened portion 18 is expanded from the outside toward the inside, rather than from the inside toward the outside as would be the case when a plier tool is used.

Figure 2:
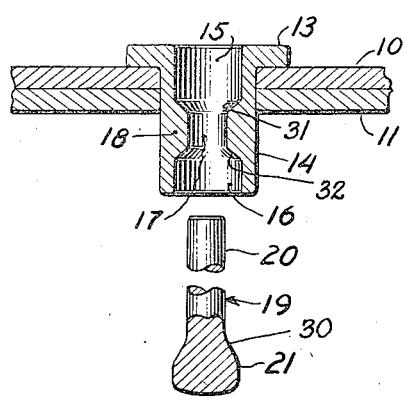
Fig. 2 is a section through plates and a rivet prior to driving, showing the draw tool by which the rivet is driven.
Figure 3:
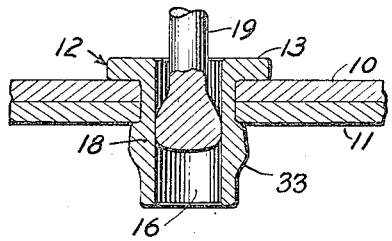
Fig. 3 is a section similar to Fig. 2 showing the driven rivet and the driving tool.
Figure 4:
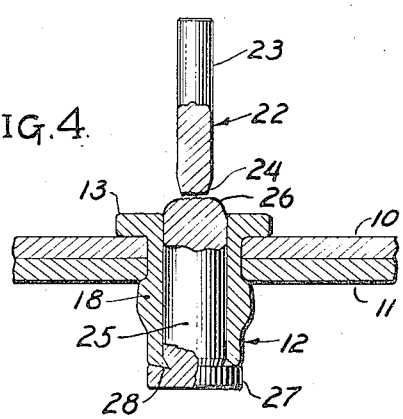
Fig. 4 is a section similar to Figs. 2 and 3 showing an alternative form of driving tool.

In the showings of Figs. 2 and 3 it will be apparent that after driving, the rivet remains hollow. In some applications it is desirable to have a solid rivet for the purpose of making a riveted container fluid tight. For this purpose a different form of mandrel may be used, such a mandrel being shown in Fig. 4. This mandrel, indicated generally as 22, comprises a thin shank 23 necked in at its bottom as at 24 whereat it is initially integral with a driving head 25 of cylindrical form, rounded at its upper end as at 26. The diameter of the mandrel portion 25 is substantially equal to the diameter of the counterbores 15 and 16 of the rivet.

The bottom of the mandrel portion 25 is provided with an undercut head 27, the undercut being indicated at 28. In utilizing this mandrel, the shank portion 23 is first inserted from the shank end of the rivet 12 after which the rivet and mandrel are passed through the plates. Thereupon, the shank 23 is grasped by a tool, as previously described, and drawn outwardly with respect to the rivet head 13. The tapered portion 26 of the mandrel engages the thickened portion 18 of the rivet, expanding same to join the metal plates. Further application of driving pressure sets the mandrel head 27 firmly against the bottom of the rivet causing a portion of the bottom of the rivet to deform and enter the undercut 28 in the mandrel. Still further application of pressure causes parting of the shank 23 from the mandrel portion 25 at the small section of the mandrel at 24, whereupon the mandrel portion 25 with its head 27 are left in the hollow of the rivet and are firmly secured from displacement by the engagement of rivet material in the undercut 28.

In any of the above described mandrels, the material of the mandrel must be considerably harder and stronger than that of the rivet and the specific showings are based upon the use of either aluminum or copper for the rivet, and steel for the driving mandrel. In the case of mandrels according to Figs. 2 and 3, the mandrel may be used over and over again for successive rivets. It will also be appreciated that although protruding rivet heads are shown, the rivet heads may be countersunk in the material and the rivet heads may partake of any of the forms well known in the art.

While I have described my invention in detail in its present embodiment, it will be obvious to those skilled in the art, after understanding my invention, that various changes and modifications may be made therein without departing from the spirit or scope thereof, I aim in the appended claims to cover all such modifications and changes.

I claim as my invention:

1. A blind rivet for securing metallic sheets in juxtaposition comprising a head having a shank of substantially uniform external diameter extending therefrom, said rivet having concentric bores of the same diameter extending from each end of the rivet toward the middle of the shank and defining a shank mid portion, said mid portion having a through hole of a diameter smaller than that of said bores defining thereby an annular collar integral with the shank and within the rivet, the ends of said collar comprising conical frusta whose conical elements are slanted with respect to the cylindrical elements of the rivet shank bores.

2. A unitary blind rivet, comprising a head having a bore of $D$ diameter, a first shank portion adjacent the head having a bore of $D$ diameter, a second shank portion contiguous with the first having a tapered bore of $D$ diameter at its end adjacent the first portion and $d$ diameter at its other end, $d$ being less than $D$, a third portion contiguous with the second having a cylindrical bore of $d$ diameter, a fourth portion having a tapered bore of $d$ diameter at its end adjacent the third portion and of $D$ diameter at its other end, said shank portions together having a uniform outer cylindrical shape.

3. A unitary blind rivet, comprising a head having a bore of $D$ diameter, a first shank portion adjacent the head having a bore of $D$ diameter, a second shank portion contiguous with the first having a tapered bore of $D$ diameter at its end adjacent the first portion and $d$ diameter at its other end, $d$ being less than $D$, a third portion contiguous with the second having a cylindrical bore of $d$ diameter, a fourth portion having a tapered bore of $d$ diameter at its end adjacent the third portion and of $D$ diameter at its other end, and a fifth portion having a cylindrical bore of $D$ diameter contiguous with the fourth portion, said shank portions together having a uniform outer cylindrical shape.

4. A unitary blind rivet, comprising a head having a bore of $D$ diameter, a first shank portion adjacent the head having a bore of $D$ diameter, a second shank portion contiguous with the first having a tapered bore of $D$ diameter at its end adjacent the first portion and $d$ diameter at its other end, $d$ being less than $D$, a third portion contiguous with the second having a cylindrical bore of $d$ diameter, a fourth portion having a tapered bore of $d$ diameter at its end adjacent the third portion and of $D$ diameter at its other end, said shank portions together having a uniform outer cylindrical shape, said rivet being adapted for driving by drawing a mandrel through the several rivet portion bores, the mandrel including a stem of less than $d$ diameter and a tapered head whose greatest diameter is no greater than $D$.

CHARLES E. HATHORN.